United States Patent
Jiang et al.

(10) Patent No.: US 6,459,455 B1
(45) Date of Patent: Oct. 1, 2002

(54) MOTION ADAPTIVE DEINTERLACING

(75) Inventors: Hong Jiang, El Dorado Hills; David Huu Tran, Loa Altos; Ernest Tinyork Tsui, Cupertino; Maximino Vasquez, Fremont, all of CA (US)

(73) Assignee: Intel Corporation, San Jose, CA (US)

( * ) Notice: Subject to any disclaimer, the term of this patent is extended or adjusted under 35 U.S.C. 154(b) by 0 days.

(21) Appl. No.: 09/386,939

(22) Filed: Aug. 31, 1999

(51) Int. Cl.[7] ............................ H04N 7/01; H04N 11/20
(52) U.S. Cl. ...................... 348/452; 348/441; 348/448
(58) Field of Search ............................... 348/448, 452, 348/451, 458, 443, 559, 441, 447, 446, 910, 264; H04N 7/01, 7/00, 11/20

(56) References Cited

U.S. PATENT DOCUMENTS

| | | | |
|---|---|---|---|
| 5,025,315 A | 6/1991 | Johary et al. | 358/140 |
| 5,428,456 A | 6/1995 | Parulski et al. | 358/340 |
| 5,532,751 A * | 7/1996 | Lui | 348/452 |
| 5,579,054 A * | 11/1996 | Sezan et al. | 348/452 |
| 5,784,115 A * | 7/1998 | Bozdagi | 348/452 |
| 5,850,264 A | 12/1998 | Agarwal | 348/469 |
| 6,118,489 A * | 9/2000 | Han et al. | 348/452 |
| 6,222,589 B1 * | 4/2001 | Faroudja et al. | 348/448 |
| 6,269,484 B1 * | 7/2001 | Simsic t al. | 348/452 |
| 6,281,933 B1 | 8/2001 | Ritter | 348/447 |

* cited by examiner

Primary Examiner—John Miller
Assistant Examiner—Trang U. Tran
(74) Attorney, Agent, or Firm—Thelen Reid. & Priest LLP

(57) ABSTRACT

A method and apparatus for deinterlacing video frames selects a location for deinterlacing, and measures motion at that location. A deinterlacing method is selected based on the measured motion. A pixel value is created for the location.

21 Claims, 4 Drawing Sheets

MOTION ADAPTIVE DEINTERLACING

BACKGROUND OF THE 1INVENTION

1. Field of the Invention

The present invention relates to video display systems. More particularly, the present invention relates to a method of deinterlacing a video signal.

2. The Background

Displaying video content that was originally created for television, on a computer display would be a useful feature of a multi-media computer system. However, television video signals and the video formats of most computer displays are not the same.

Computers commonly use a noninterlaced video display format, also called a progressive scan. That is, an entire frame is scanned line-by-line, typically from top to bottom. The process repeats and re-scans the entire frame at a given refresh rate, for example, 75 Hz. In contrast, many sources of consumer video, such as television signals, use an interlaced display format. Interlaced systems interleave two or more fields to display an entire frame. A typical U.S. NTSC television signal uses two fields, each with video data for every other horizontal line of the entire frame, and consecutively scans the two fields 30 times per second. The viewer perceives the resulting image as a blend of the two individual fields with an effective refresh rate of 60 Hz. If instead, the entire frame was scanned progressively at 30 Hz, the viewer might perceive a flicker of the displayed image. The flicker is much less apparent with higher refresh rates such as 60 Hz. The interlaced format thus reduces flicker without requiring a doubling of the data transfer rate needed to update the entire frame at 60 Hz. Other interlaced video formats are also common, such as the 50 Hz phase alternation line (PAL) system used in Europe. All such interlaced formats use the technique of interleaving fields to create an entire frame, and the present invention is not intended to be limited to deinterlacing any particular interlaced video format.

Modern computer systems are not constrained by data transfer rates required for the noninterlaced format to the same extent as were early television systems. However, the use of interlaced display formats for many consumer video products is common and unlikely to disappear soon. In order to display this interlaced material on a noninterlaced computer display there is a need for deinterlacing.

SUMMARY OF THE INVENTION

A method and apparatus for deinterlacing video frames selects a location for deinterlacing, and measures motion at that location. A deinterlacing method is selected based on the measured motion. A pixel value is created for the location.

DETAILED DESCRIPTION OF A PREFERRED EMBODIMENT

The present invention detects motion in an image and uses a measure of the motion to select a deinterlacing algorithm. Motion adaptive deinterlacing is performed on a pixel-by-pixel basis over the entire image. Different areas of an image may use different deinterlacing algorithms in response to the amount of motion present in those areas.

Figure 1:
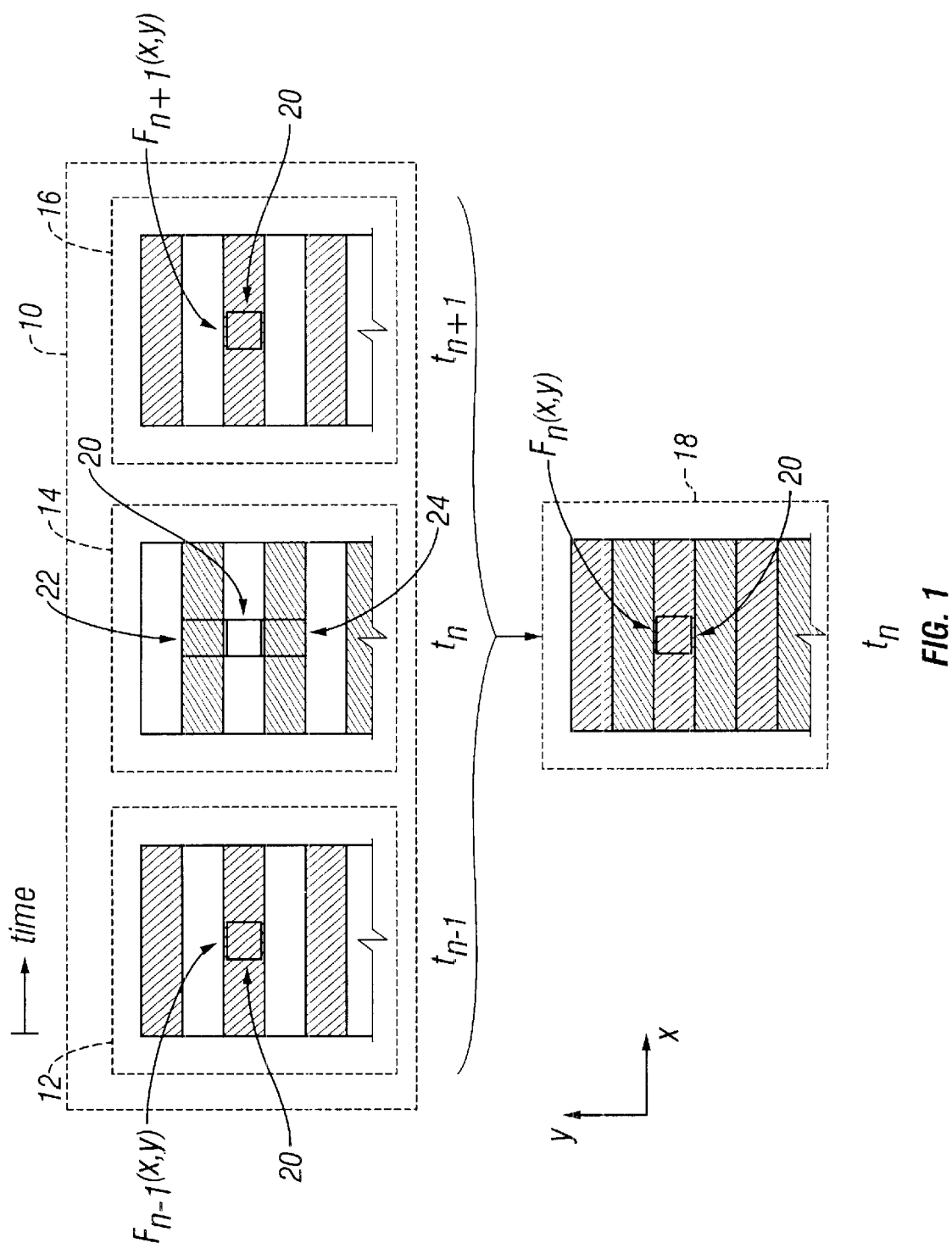
FIG. 1 is a diagram depicting a sequence of three interlaced video format fields and a deinterlaced output frame.

FIG. 1 shows a sequence 10 of three consecutive fields of an interlaced video signal and a corresponding deinterlaced output frame 18. Output frame 18 corresponds to time $t_n$, fields 12, 14 and 16 correspond to times $t_{n-1}$, $t_n$ and $t_{n+1}$ respectively.

The present invention involves a method of creating output frame 18 from sequence 10 on a pixel-by-pixel basis. The pixel at location 20 exists, or has a value, in fields 12 and 16; it does not exist in field 14 corresponding to time $t_n$. However, pixels 22 and 24, above and below location 20, do have values at time $t_n$. Prior art deinterlacing methods typically use one of three methods to create a value for the pixel at location 20 at time $t_n$: duplication, vertical interpolation and temporal interpolation. Each of these methods has strengths and weaknesses, the present invention may use both methods.

Duplication uses all the pixel values from field 12, at time $t_{n-1}$, for values at those same pixel locations at time $t_n$. Duplication is the simplest and requires the least computation of any deinterlacing method. However, duplication does not increase the vertical resolution of the resulting output frame 18. Duplication also has disadvantages when there is motion from one frame to the next at a particular pixel location. Instead of "freezing" the moving image at a single point in time, the duplication method effectively behaves like a camera that leaves the shutter open for one half the horizontal lines in the succeeding field, which introduces a "weave" method since it weaves together the horizontal lines of two consecutive fields, such as fields 12 and 14 at times $t_{n-1}$ and $t_n$. Mathematically, the weave method W(x, y) can be described with the following equation $$W(x,y) \ni F_n(x,y) = F_{n-1}(x,y)$$

where W(x,y) denotes the weave method is performed for the current frame, that is at time $t_n$, on the pixel at location (x,y) by setting the weave method value equal to the value of the same pixel location F(x,y) at time $t_{n-1}$.

Vertical interpolation uses only information in field 14, corresponding to $t_n$, and then uses the data for pixel locations 22 and 24 to compute a value for pixel location 20 at time $t_n$. Vertical interpolation performs better than duplication in the presence of motion, by not allowing a blur to spread among fields corresponding to different points in time. The vertical interpolation method is often referred to as the "bob" method. Mathematically, the bob method B(x,y) can be described in the following equation $$B(x, y) \ni F_n(x, y) = \frac{F_n(x, y+1) + F_n(x, y-1)}{2}$$

where B(x,y) denotes the bob method is performed for the current frame (time $t_n$) on the pixel at location (x,y) by setting to the bob methd pixel value F(x,y) to the average of the pixels above and below pixel location (x,y).

Temporal interpolation uses the pixel values of fields 12 and 16, corresponding to times $t_{n-1}$ and $t_{n+1}$ respectively, to assign a value to pixel location 20 at time $t_n$. Like vertical interpolation, temporal interpolation requires some computation. Unlike vertical interpolation within a single field, the temporal interpolation method computations require the pixel values for fields representing times both before and after that of output frame 18. Temporal interpolation increases the vertical resolution of an image where there is no motion between successive fields. For situations where there is motion in an image, temporal interpolation blurs output frame 18 with motions from fields 14 through 16. That is, temporal interpolation leaves the camera shutter open from $t_{n-1}$ until $t_{n+1}$. Mathematically, the temporal interpolation method T(x, y) at time $t_n$ can be described as $$T(x, y) \ni F_n(x, y) = \frac{F_{n-1}(x, y) + F_{n+1}(x, y)}{2}$$

A measure of motion used in one embodiment of the present invention is the difference in pixel values at a given location over a period of time. Referring to FIG. 1, there are many definitions of motion may be used and the present invention is not intended to be limited to any particular measure of motion in a stream of video data. Such motion might be defined as, but not limited to, the absolute value of the difference in the values of the pixel at location 20 between sequential fields 12 and 16. We will let the motion at a location m(x,y) be defined by the following equation $$m(x,y) = |F_{n-1}(x,y) - F_{n+1}(x,y)|$$

where the values of the pixels at location (x,y) in fields 12 and 16 correspond to times $t_{n-1}$ and $t_{n+1}$ respectively.

In addition to measuring motion, the present invention uses one or more motion threshold values, denoted as δ, in choosing a deinterlacing algorithm. In one embodiment of the present invention both a low threshold ($\delta_L$) and a high threshold ($\delta_H$) value are used. Any number of thresholds might be used and there is no fundamental limit to the range of possible threshold values, and the present invention is not intended to be limited to any number or range of thresholds.

A form of motion adaptive deinterlacing may be defined by the following equation $$F_n(x, y) = \begin{cases} W(x, y) & \text{if } m(x, y) < \delta_L \\ I(x, y) & \text{if } \delta_L \leq m(x, y) < \delta_H \\ B(x, y) & \text{if } m(x, y) \geq \delta_H \end{cases}$$

where the value of the motion at a pixel location m(x,y), is compared to threshold motion values, $\delta_L$ and $\delta_H$, and is then used to select a deinterlacing algorithm at that pixel location in the current frame. The value of the pixel in output frame 18 $F_n(x,y)$ is then determined by the weave method W(x,y), the bob method B(x,y) or an intermediate method I(x,y). That is, the weave method is used for pixel locations that show relatively constant values from field to field, the bob method is used for locations with more than a threshold amount of motion, and an intermediate method is used for cases in between.

Figure 2:
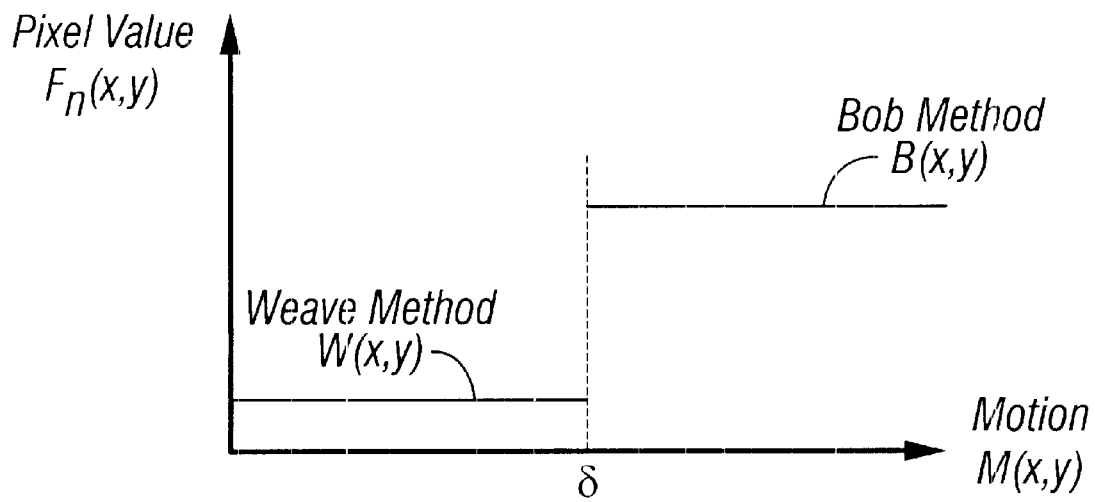
FIG. 2 is a diagram depicting a hard switch transition between two motion adaptive deinterlacing methods.

FIG. 2 illustrates an embodiment of the present invention using a "hard-switch" between the weave and bob deinterlacing methods. There is an abrupt transition between deinterlacing methods at the motion threshold value. In this embodiment there is only one threshold δ (or equivalently both $\delta_L$ and $\delta_H$ are equal and non-zero) that is used to switch between the weave and bob methods. Weave is used for low motion pixels and bob is used for high motion pixels. This embodiment is relatively easy to implement, although, this hard switch lacks a smooth transition for dealing with motion values from just below to just above the motion threshold δ.

Figure 3:
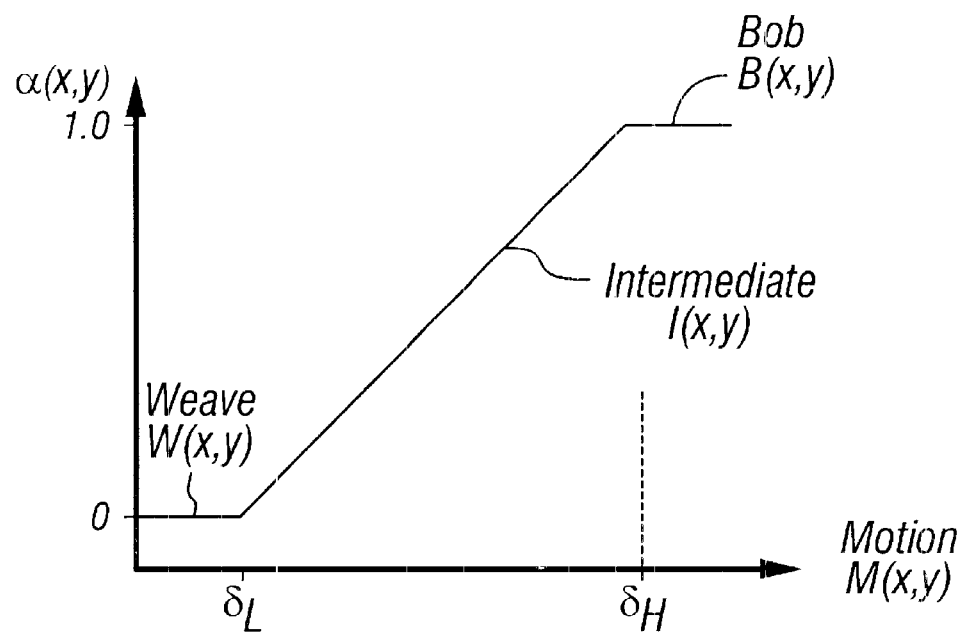
FIG. 3 is a diagram depicting a linear transition between two motion adaptive deinterlacing methods.

FIG. 3 illustrates an embodiment of the present invention using a "soft-switch" in the form of a linear combination of weave and bob deinterlacing algorithms for motions values between $\delta_L$ and $\delta_H$. This embodiment provides a smooth transition between the threshold values. The mathematics to implement this embodiment are relatively straightforward and can be defined as $$I(x,y) = (1-\alpha)W(x,y) + \alpha B(x,y)$$

where the interpolation weighting factor α is a linear ramp $$\alpha = \frac{m(x, y) - \delta_L}{\delta_H - \delta_L}$$

Figure 4:
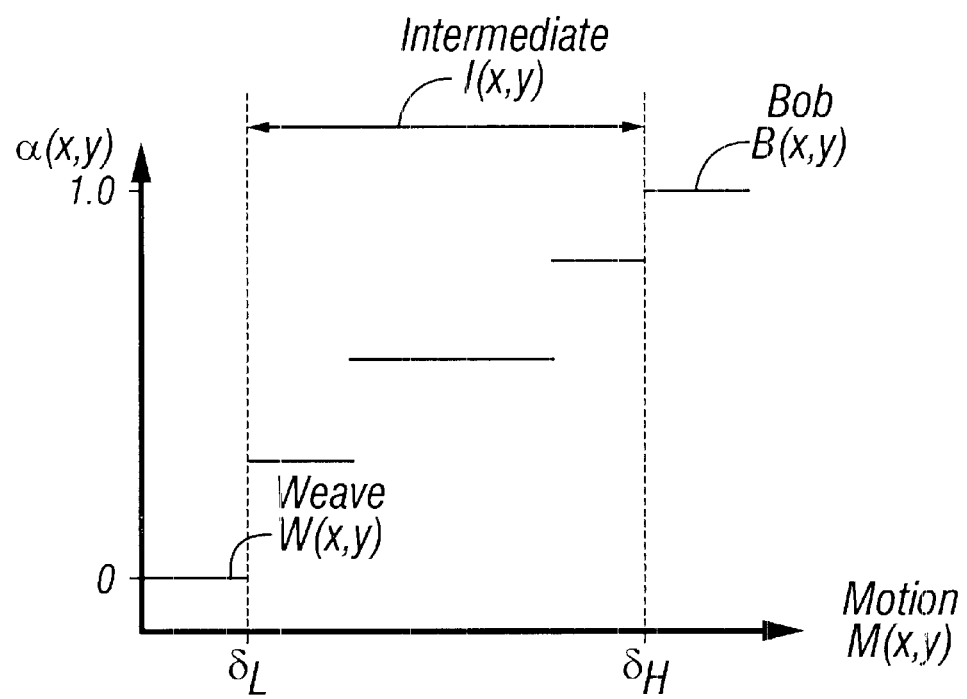
FIG. 4 is a diagram depicting a step function approximation of FIG. 3.

Although the mathematics of the embodiment shown in FIG. 3 are straightforward, implementing such a linear interpolation typically requires floating point operations that are computationally less efficient than using adders and shifters. To approximate a linear ramp, a set of step functions may be used. FIG. 4 shows a soft-switch embodiment of a deinterlacing method using such an approximation of an interpolation function with step functions that can be implemented with adders and shifters, avoiding the need for floating point operations. The number of "steps" used in a function such as that shown in FIG. 4 can be adjusted according the transition smoothness desired, the difference between $\delta_L$ and $\delta_H$, the computational power available, and the speed required, among other considerations. Those of ordinary skill in the art will be familiar with such design and engineering considerations in selecting and implementing an appropriate approximation, and the present invention is not intended to be limited to any particular method of approximating an interpolation function.

The use of motion thresholds, such as, but not limited to, $\delta_L$ and $\delta_H$, allows for a variety of motion adaptive deinterlacing methods. Preferably, the threshold values are set according to factors such as the noise level in the video signal, the amount of motion expected, and the contrast expected in an image. Thresholds would best be based on, and set individually for, a particular video sequence. Another embodiment of the present invention uses experimentation and subjective judging of various combinations of thresholds and deinterlacing methods for a particular body of video source material. For embodiments of the present invention where such custom fitting of motion thresholds is not practical, assumptions must be made about the statistics of motion. For example, the embodiment shown in FIG. 2 inherently assumes that all motions fall into a particular bin of a two-bin histogram and may be processed accordingly. Naturally, the better the a priori assumption of the statistical distribution of motion, the better job will be accomplished in creating output frame 18. There is, of course, a tradeoff between a computationally efficient deinterlacing method and the quality of the output frame 18. As the trend toward faster and lower priced computing power continues, the choice between speed and image quality changes. What is not computationally achievable at practical cost today may be achievable in a short time. The present invention is not intended to be limited to any particular method of defining or setting motion thresholds.

Figure 5:
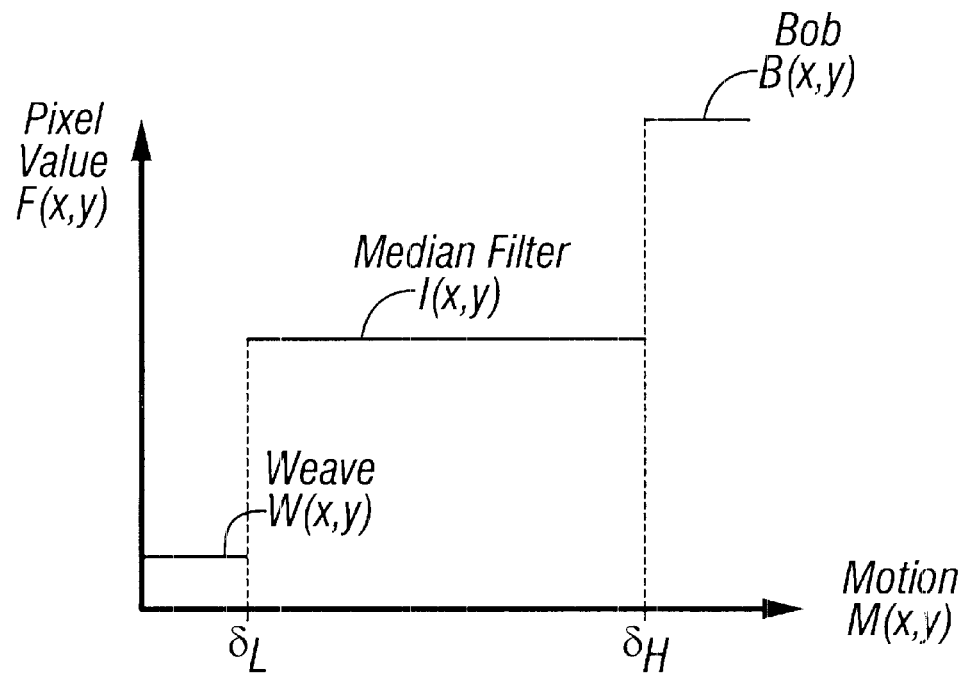
FIG. 5 is a diagram depicting a median filter transition between two motion adaptive deinterlacing methods.

There are situations in which the motion is very fast, so that a moving object may only appear in the present field and not in the past or future. Examples of such motions may include sports, fast action scenes in movies, and rain or snow scenes. Such motions may be classified as "static" by a motion detection scheme, and the resulting output frame 18 may then include unwanted artifacts. Periodic motion with a frequency closely correlated to the video refresh rate may create a similar problem. The present invention uses a filter method to reduce these unwanted artifacts. There are many possible filters and filtering methods. One embodiment of the present invention uses these filtering schemes as intermediate deinterlacing methods for motions between motion thresholds $\delta_L$ and $\delta_H$. One such filter, a median filter, is shown in FIG. 5 and is described by the equation $$I(x,y)=\text{median}(F_n(x,y-1),F_n(x,y+1),F_{n-1}(x,y))$$

where the intermediate interlacing method for the current frame I(x,y) is the median of two pixel values from $t_n$ and one pixel value from $t_{n-1}$.

Setting the lower threshhold $\delta_L$ equal to zero creates a hard switch deinterlacing method using a median filter method for low motion values and the bob method for high motion values. Setting $\delta_L$ to less than the random noise level in a video sequence allows the weave method to be used for static portions of a scene with a high signal-to-noise ratio (SNR), such as subtitles in a digital video disk (DVD) movie, and the median filter for the rest of the non-motion pixels. In yet another embodiment, a median filter is used for those static portions of an image where the vertical spatial frequency is less than the half-Nyquest value, such as with horizontal lines wider than one pixel, to provide a good recovery of a static image. However, the median filter method does produce an output frame 18 with some level of flickering (noise) compared to the weave method alone.

Filtering techniques may also be used to filter input to the motion detector in order to reduce the noise in the reference pixels. An example of such a filtering technique includes a horizontal low pass filter, such as a three-tap filter with coefficients (1, 2, 1), along with a median filter, such as $$m(x,y)=|\overline{F}_{n-1}(x,y)-\overline{F}_{n+1}(x,y)|$$

where $$\overline{F}_{n-1}(x, y) = \frac{F_{n-1}(x-1, y) + 2F_{n-1}(x, y) + F_{n-1}(x+1, y)}{4}$$

$$\text{and } \overline{F}_{n+1}(x, y) = \frac{F_{n+1}(x-1, y) + 2F_{n+1}(x, y) + F_{n+1}(x+1, y)}{4}$$

and so that the motion m(x,y) is calculated by examining a weighted average of three adjacent pixel values at times before and after that corresponding to output frame 18. Those of ordinary skill in the art will readily see that using coefficients such as (1, 2, 1) allows the needed computations to be made with shifts and additions, instead of with more cumbersome floating point operations.

A combination of a high and low pass filters for separately processing spatial and temporal resolution components of a video signal is another embodiment of the present invention. This technique is based on the assumption that human vision tends to lose spatial information for a moving object and pick up spatial details for a still object, thus each "subband" is processed separately and combined in a median filter. Since deinterlacing only occurs vertically (between horizontal rows of pixels), only vertical decomposition of the subbands is performed. This embodiment is described by the following equation $$I(x,y)=I(x,y)_{LOW}+I(x,y)_{HIGH}$$

where $$I(x,y)_{LOW}=0.25*F_n(x,y-1)+0.5*F_n(x,y)+0.25*F_n(x,y+1)$$

and $$I(x,y)_{HIGH}=-0.25*F_n(x,y-1)+0.5*F_n(x,y)-0.25*F_n(x,y+1)$$

The above embodiments are only a few of the many filter based motion adaptive deinterlacing methods that may be used, the present invention is not intended to be limited to any particular filter or filtering method.

The above discussion used the term "pixel value" while describing the values in output frame 18. For video images made up completely of gray scale pixels, such as black-and-white movies, a single pixel value is all that is required. For example, eight bits are often used to define 256 levels of gray (0 for black through 255 for white) as values that are available to fully describe each pixel. For color video signals, however, three parameters are usually required to fully describe a pixel in color space. For example, three parameters each using eight bits are used for 24 bit color representations displayed on many personal computers. This somewhat complicates the process of deinterlacing. The typical computer display uses RGB color space. In RGB color space, the amount of red green and blue, each of which can take on a range of values, is specified for each pixel. The motion adaptive deinterlacing process may be performed separately on each of the three color space parameters, or, in order to minimize the number of computations required, on only the one of the color space parameters, or preferably, on a linear combination of the three color space parameters. However, RGB color space is not well suited for performing the mathematical operations used for deinterlacing, as are gray scales. Fortunately, there are ways other than RGB colorspace for describing a color i m age, two being YUV and YCbCr, and relatively simple mappings between these color spaces and ROB. It is also fortunate that many sources of consumer video, such as television signals, already use these alternative color space schemes to describe color video images. The details of various color spaces are complex, although they are well known to those of ordinary skill in the art. Essentially what the color spaces preferred for digital image processing share is a single parameter describing the black-and-white video image and two parameters describing the color information. For both the YUV and YCbCr color spaces the Y parameter, referred to as the luma or luminance, holds the black-and-white information and the other two parameters, collectively referred to as the chroma or chrominance, hold the color information.

The motion adaptive deinterlacing process may be performed separately on each of the three color space parameters, or preferably, in order to minimize the number of computations required, on only the luma data. When a luma value is created for a pixel in output frame 18, the two chroma values are created using the same deinterlacing method. That is, if the weave method was selected for creating the luma value then the weave method is used to create both chroma values. There are situations, mainly due to video image compression techniques, where the number and/or location of luma and chroma values in a video image do not coincide. The present invention uses the nearest point with a luma value, or one above the location, in order to make a deinterlacing decision for a chroma value. After performing the deinterlacing the pixel values may be converted into RGB color space for display.

Figure 6:
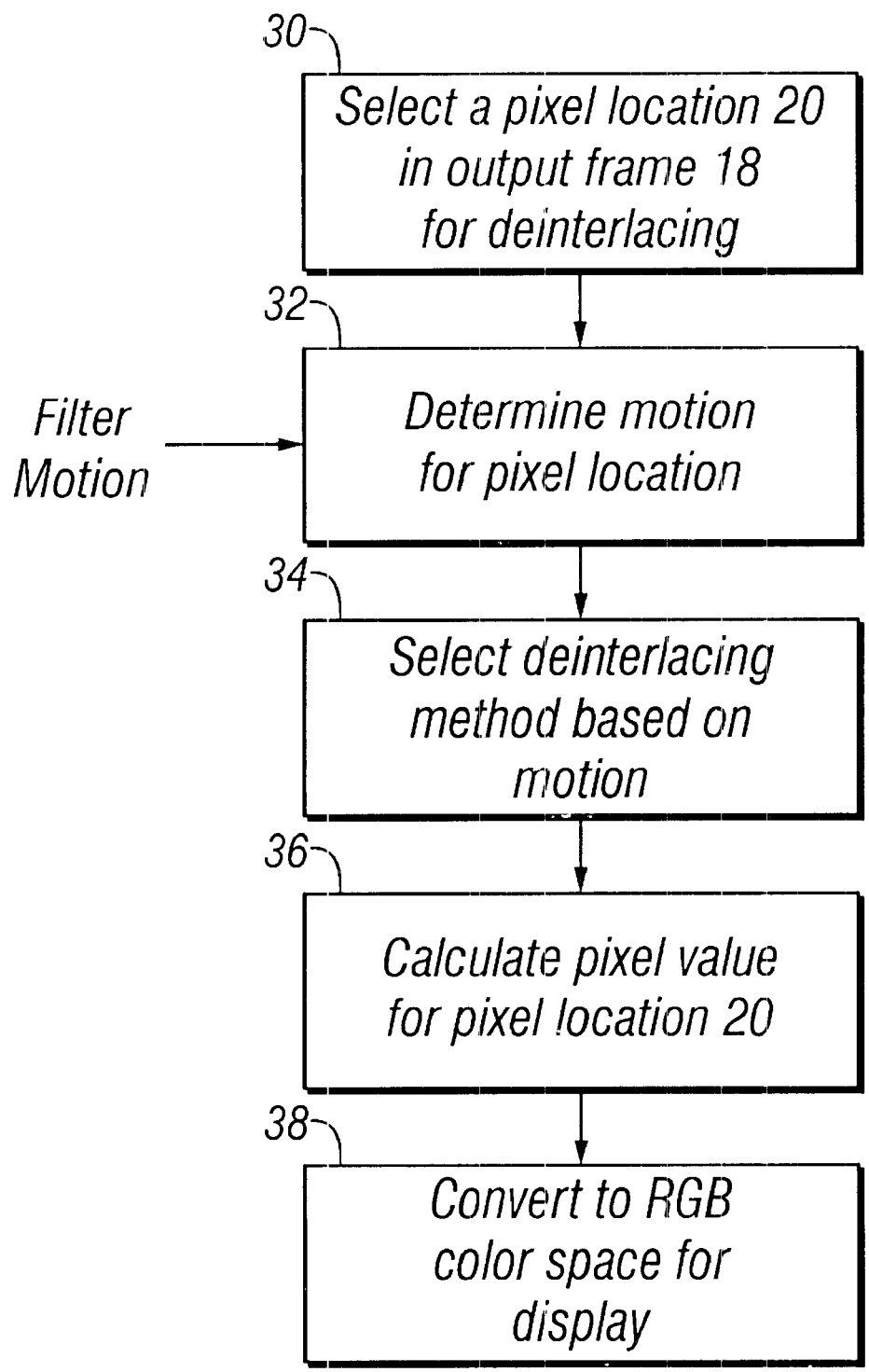
FIG. 6 is a process flow diagram of a motion adaptive deinterlacing method in accordance with an embodiment of the present invention.

FIG. 6 shows a process flow diagram of an embodiment of the present invention for accomplishing the motion adaptive deinterlacing process. At reference number 30 a pixel location in 20 output frame 18 is selected for de-interlacing. This is done iteratively to cover the entire frame. At 32 a motion value is determined for the selected pixel location.

The motion may be directly calculated as the difference between values of the pixel at location 20 over a period of time. Optionally, the motion may be filtered as described above. A three-tap low pass filter, to reduce noise in the reference pixels is one such filter. Other motion filters may be used as well. At 34 a de-interlacing method is selected based upon the determined motion value for the selected pixel location. At 36 a pixel value is calculated for the selected pixel location in output frame 18. At 38, the pixel value is converted to RGB color space for final display. The conversion to RGB color space may be performed on a pixel-by-pixel basis, a frame-by-frame basis, or at any time prior to presenting the image on the display.

The present invention may be implemented in software or firmware, as well as in programmable gate array devices, ASIC and other hardware.

While embodiments and applications of this invention have been shown and described, it would be apparent to those skilled in the art after perusing this disclosure that many more modifications than mentioned above are possible without departing from the inventive concepts herein. The invention, therefore, is not to be restricted except in the spirit of the appended claims.

What is claimed is:

1. A method of deinterlacing video frames, comprising:
   selecting an output pixel location within an output frame;
   measuring a motion value, wherein said measuring a motion value comprises:
      measuring a low motion threshold value; and
      measuring a high motion threshold value;
   selecting a deinterlacing algorithm based on said motion value and at least one motion threshold value, wherein said selecting comprises:
      selecting an intermediate deinterlacing algorithm when said measured motion value is neither less than said low motion threshold value nor greater than said high motion threshold value; and
   calculating a pixel value for said output pixel location with said deinterlacing algorithm.

2. A method in accordance with claim 1, wherein said intermediate deinterlacing algorithm is a combination of a bob deinterlacing algorithm and a weave deinterlacing algorithm.

3. A method in accordance with claim 1, wherein said intermediate deinterlacing algorithm is a linear combination of a bob deinterlacing algorithm and a weave deinterlacing algorithm.

4. A method in accordance with claim 1, wherein said intermediate deinterlacing algorithm is a step function combination of a bob deinterlacing algorithm and a weave deinterlacing algorithm.

5. A method in accordance with claim 1, wherein said intermediate deinterlacing algorithm is a median filter.

6. A method in accordance with claim 5, further comprising:
   setting said low motion threshold based on a vertical spatial frequency value.

7. A deinterlacer to display interlaced video format on a noninterlaced video display, comprising:
   a motion measurer to measure motion at a pixel location;
   a plurality of deinterlacing algorithms to create a pixel value at said pixel location,
   wherein said plurality of deinterlacing algorithms include a sub-band decomposition algorithm;
   an algorithm assignment engine to select at least one of said plurality of deinterlacing algorithms, wherein said algorithm assignment engine responsive to said motion measurer.

8. A deinterlacer in accordance with claim 7, further comprising a motion filter.

9. A computer system to display interlaced video format on a noninterlaced video display, comprising:
   a motion measurer to measure motion at a pixel location;
   a deinterlacer responsive to said motion measurer to create a new pixel value, wherein said deinterlacer includes a plurality of deinterlacing algorithms;
   a first motion threshold value to select among said plurality of deinterlacing algorithms;
   a second motion threshold value to select among said plurality of deinterlacing algorithms;
   an intermediate deinterlacing algorithm to measure motion between said first motion threshold value and said second motion threshold value; and
   an output frame generator to assemble said new pixel values for the noninterlaced video display.

10. An apparatus for deinterlacing video frames, comprising:
   means for selecting an output pixel location within an output frame;
   means for measuring a motion value, wherein said means for measuring comprises a low motion threshold value and a high motion threshold value;
   means for selecting a deinterlacing algorithm based on said motion value and at least one motion threshold value, wherein said means for selecting comprises an intermediate deinterlacing algorithm that is selected when said measured motion value is neither less than said low motion threshold value nor greater than said high motion threshold value; and
   means for calculating a pixel value for said output pixel location with said deinterlacing algorithm.

11. The apparatus in accordance with claim 10, wherein said intermediate deinterlacing algorithm is a combination of a bob deinterlacing algorithm and a weave deinterlacing algorithm.

12. The apparatus in accordance with claim 10, wherein said intermediate deinterlacing algorithm is a linear combination of a bob deinterlacing algorithm and a weave deinterlacing algorithm.

13. The apparatus in accordance with claim 10, wherein said intermediate deinterlacing algorithm is a step function combination of a bob deinterlacing algorithm and a weave deinterlacing algorithm.

14. The apparatus in accordance with claim 10, wherein said intermediate deinterlacing algorithm is a median filter.

15. The apparatus in accordance with claim 10, further comprising:
   means for setting said low motion threshold based on a vertical spatial frequency value.

16. A computer-readable medium having stored thereon computer-executable instructions for performing a method of deinterlacing video frames, the method comprising:
   selecting an output pixel location within an output frame;
   measuring a motion value, wherein said measuring a motion value comprises:
      measuring a low motion threshold value; and
      measuring a high motion threshold value;
   selecting a deinterlacing algorithm based on said motion value and at least one motion threshold value, wherein said selecting comprises:
      selecting an intermediate deinterlacing algorithm when said measured motion value is neither less than said low motion threshold value nor greater than said high motion threshold value; and calculating a pixel value for said output pixel location with said deinterlacing algorithm.

17. A computer-readable medium in accordance with claim 16, wherein said intermediate deinterlacing algorithm is a combination of a bob deinterlacing algorithm and a weave deinterlacing algorithm.

18. A computer-readable medium in accordance with claim 16, wherein said intermediate deinterlacing algorithm is a linear combination of a bob deinterlacing algorithm and a weave deinterlacing algorithm.

19. A computer-readable medium in accordance with claim 16, wherein said intermediate deinterlacing algorithm is a step function combination of a bob deinterlacing algorithm and a weave deinterlacing algorithm.

20. A computer-readable medium in accordance with claim 16, wherein said intermediate deinterlacing algorithm is a median filter.

21. A computer-readable medium in accordance with claim 20, wherein the method further comprises:

setting said low motion threshold based on a vertical spatial frequency value.

* * * * *

UNITED STATES PATENT AND TRADEMARK OFFICE
CERTIFICATE OF CORRECTION

PATENT NO. : 6,459,455 B1 Page 1 of 1
DATED : October 1, 2002
INVENTOR(S) : Hong Jiang et al.

It is certified that error appears in the above-identified patent and that said Letters Patent is hereby corrected as shown below:

In column 2 line after line 33 and before line 34 insert the following
-- blur between the fields at times $t_{n-1}$ and $t_n$. Duplication is often referred to the --

Column 5,
Line 14, in between the words "lower" and "threshhold" insert the word
-- motion --

Column 6,
Line 31, replace "i m age," with -- image --
Line 30 replace "ROB" with -- RGB --

Signed and Sealed this

Twenty-ninth Day of April, 2003

JAMES E. ROGAN
*Director of the United States Patent and Trademark Office*